H. K. JONES.

Machines for Graduating Carpenters' Squares.

No. 5,408. Reissued May 13, 1873.

Witnesses
Julius Rabb
Miles L. Peck.

Inventor.
Horace K. Jones.
By James Shepard Atty.

A.M. PHOTO-LITHOGRAPHIC CO. N.Y. (OSBORNE'S PROCESS.)

UNITED STATES PATENT OFFICE.

HORACE K. JONES, OF KENSINGTON, CONNECTICUT, ASSIGNOR TO THE HART, BLIVEN AND MEAD MANUFACTURING COMPANY, (FORMERLY KNOWN AS THE HART MANUFACTURING COMPANY.)

IMPROVEMENT IN MACHINES FOR GRADUATING CARPENTERS' SQUARES.

Specification forming part of Letters Patent No. 93,449, dated August 10, 1869; reissue No. 5,408, dated May 13, 1873; application filed February 25, 1873.

*To all whom it may concern:*

Be it known that I, HORACE K. JONES, of Kensington, in the county of Hartford and State of Connecticut, have invented certain new and useful Improvements in Machinery for Graduating Carpenters' Squares, of which the following is a specification:

In the machine hereinafter described, the gravers are arranged in sets, mounted on horizontal bars supported by two vertical revolving disks, and are operated in such manner, by means of cams and springs, that the said gravers can be alternately thrown into and out of action during their stroke, and remain in action for a predetermined period of time, to cut graduation-marks of varying lengths. Furthermore, in my said machine, there is employed a novel clamping device, for firmly holding carpenters' squares of varying tapers.

Figure 1:
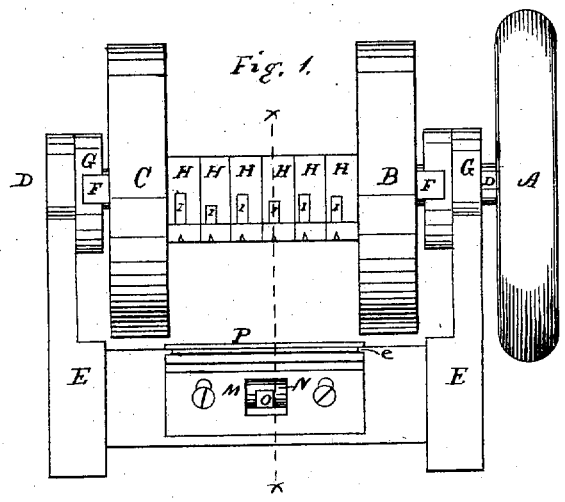
Figure 2:
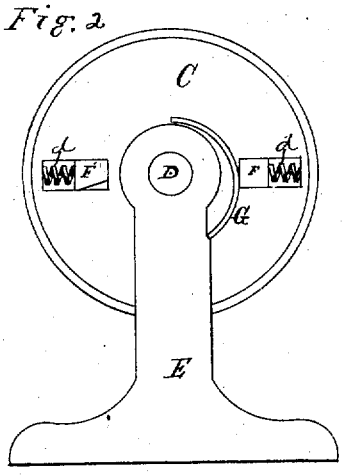
Figure 3:
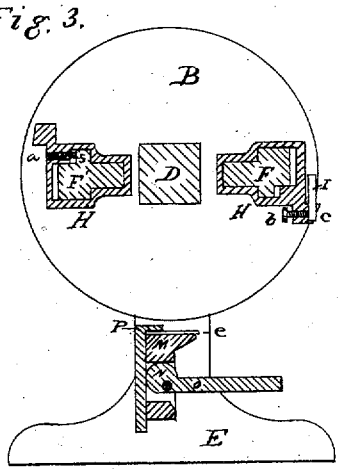
Figure 4:
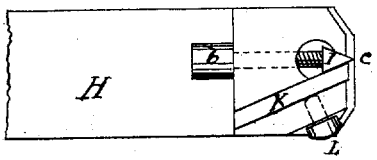
Figure 5:
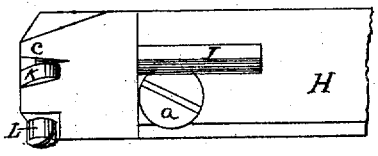

In the accompanying drawing, Figure 1 is a front view of my improved machine. Fig. 2 is an end view of the same from the left of Fig. 1. Fig. 3 shows a vertical section through the line *x x*, Fig. 1. Fig. 4 is a bottom view of the tool and holder when in the position shown in Fig. 1; and Fig. 5 is a view of the cutting-face of the tool-holder, or a front view, as shown in Fig. 1.

A designates the driving-pulley, attached to the main shaft D, having its bearings in the supports on frame E. Fitted to the shaft D, and turning with it, are circular disks B C, provided with radial slots, which receive the bars F F′, upon which bars the tool-holders H H are placed. The ends of these bars project beyond the disks sufficiently to engage with the cams G G on the frame E, when the disks revolve. The tool-holders H are mounted on the bars F F′, as shown in Fig. 3, the bars passing through properly-shaped apertures in the holders into which they fit, so that the holders can have a sliding motion inward and outward from the centers on which they revolve. The tool-holders are held outward, in the position shown in Fig. 3, by means of the springs *s*, whose force is regulated by the screw-plug *a*, Figs. 3 and 5. The tool I is held in the tool-holder by being inserted in a properly-formed receptacle, and clamped by the screw *b*, Figs. 3 and 4. The tool is shown of a triangular form in the drawing. If of this form, either of the three edges may be used for engraving the lines. The back part of the tool may, however, vary in form, so that the cutting-edge is made of a certain uniform angle. The tool rests in the holder in a groove of the exact inclination of its sides, into which it fits, and is pressed into its position by the set-screw *b*. This insures the tool always being reinserted in the same position, when removed from the machine for sharpening. The face of the tool-holder at *c*, Figs. 3, 4, and 5, is cut away, so as to expose the point or corners of the tool to act upon the square. Alongside of the tool, but not binding upon it, there is let into the tool-holder a gage, K, commonly termed the shoe, for regulating the depth of the cutting of the graver. This gage is set in its proper place and secured by the screw L, which holds it firmly in its place. The cams G G are for the purpose of pressing out the bars F F′, which are otherwise held in toward the center by the springs *d d*, so that the tools are projected beyond what would otherwise be their path, to take hold of the edge of the square, at *e*, Fig. 3. The ends of the cams are in such a position, and are so shaped, that the bars drop off just when the gravers have drawn the lines of sufficient length, and this permits the springs *d d* to retract the gravers into the path in which they were moving when they were set outward by the cams G, and arrest their cutting action without arresting their forward movement. The length of the several graduations is regulated by the shape of the ends of the bars F F′. The bar F′, it will be observed, has a corner removed. This causes the bar to drop off the end of the cam G sooner than the bar F, and therefore the tools on the bar F′ will draw shorter lines than those on F.

In the drawing only two sets of tool-holders are shown; but there may be as many bars holding sets of tools, arranged around the circumference of the disks B and C as the space will allow. The tools in each set are arranged a certain exact distance apart—as one inch— and those of the different sets are arranged so as not to follow each other, but be a certain distance apart—as one-sixteenth, one-eighth, one-fourth, one-half, &c.—to one side, so that each set of tools engraves a certain set of graduations, there being a greater or less number of sets of tools, according as the graduations are finer or coarser.

In order to graduate the blade of a square twenty-four inches long to sixteenths of an inch there would require to be sixteen sets, of twenty-four tools each, arranged around the circle. One set would engrave the inch marks; another set the half-inch; two sets the quarters; four sets the eighths; and eight sets the sixteenths, each set making one mark in each inch.

The adjustable clamping device is as follows: P is a fixed jaw for holding the square to be graduated. This jaw is rigidly secured to the frame of the machine, so that its under face is parallel to the axis of the shaft D, or, in other words, parallel to that longitudinal line upon which the points of the series of gravers act. M is the movable jaw of the vise, which is held in place by screws passing through slots in the jaw M into the frame, so that said jaw is free to play up and down at either or both ends; and it is pressed up against the fixed jaw P (or against any object placed between said jaws) by means of the cam N, operated by the treadle O to bear upon the jaw M near the middle of its length.

In case a tapering square is placed between the jaws and the treadle O depressed the movable jaw M will rock upon the cam N, and thereby accommodate itself thereto and hold the upper side of the square blade clamped on the proper line for the action of the gravers.

The part M can also be made in two or more parts, connected by a system of one or more horizontal levers, for the purpose of distributing the pressure applied at one point over the whole length of the blade of the square and conform to its irregularities of surface.

The operation of my machine is as follows: The square is placed on the jaw M and clamped firmly up against the jaw P to hold it. The disks B and C revolve and bring the successive sets of tools against the edge of the blade. The ends of the bars F, on which the graver-holders are mounted, follow the surface of the cams G and press out the sets of tools successively against the square. The gages K ride upon the surface of the blade, and are held firmly in contact with it by the springs *s*, allowing the tools to enter the exact distance to which they are set from the faces of the gages K. The tools thus come in contact with the square at its edge upon one side and grave a line toward its opposite edge. When the ends of the bars F, &c., drop off the end of the cams G the tools upon the bar thus released are raised from the square, and continue their forward movement without cutting the square beyond the point from which the gravers were raised.

It will be observed that all the gravers have a positive forward stroke of uniform length, and begin to grave at one edge of the square, and that the lengths of the lines graved are regulated by arresting the cutting action of the graver when in motion, and allowing it to continue its forward movement without cutting the square, making what is called "a flying cut."

I claim as my invention—

1. The combination of the cams G and bars F with the tool-holders H and tools I, when the parts are constructed and arranged substantially as herein described.

2. The combination of the bars F, spring *s*, tool-holder H, and gage K, all constructed and arranged substantially as described.

3. The construction of the tool and socket so that the edge of the tool fits into a V-shaped recess, the angle of which is in line with the working-point of the tool, substantially as and for the purpose herein described.

4. The arrangement of the several sets of tool-holders and tools upon the successive bars F in the manner described, so that only one line is cut by the same graver, and the several lines of graduation are cut by successive tools at certain distance to the right or left, substantially as herein described.

5. In a machine for cutting graduations on squares, &c., the combination of the gravers I and their holders H with cams G and springs *d*, for throwing the gravers out of action at predetermined periods of time during the stroke of the same to cut graduation-marks of varying lengths, substantially as described.

6. The clamping device for holding squares of varying tapers to be graduated, consisting of the fixed jaw P, the rocking adjustable jaw M, and the cam N, in combination, substantially as described.

Witnesses: HORACE K. JONES.
THERON UPSON,
C. E. MITCHELL.